B. RUBIN

April 21, 1931. DETACHABLE TREAD MEMBER Re. 18,054

Original Filed Aug. 29, 1927

Benjamin Rubin INVENTOR

BY Victor J. Evans

ATTORNEY

WITNESS: H. H. Pamdl

Reissued Apr. 21, 1931 Re. 18,054

UNITED STATES PATENT OFFICE

BENJAMIN RUBIN, OF PHILADELPHIA, PENNSYLVANIA, ASSIGNOR, BY DIRECT AND MESNE ASSIGNMENTS, TO RUBIN PATENTS CORPORATION, A CORPORATION OF DELAWARE

DETACHABLE TREAD MEMBER

Original No. 1,696,058, dated December 18, 1928, Serial No. 216,188, filed August 29, 1927. Application for reissue filed June 19, 1929. Serial No. 372,189.

The present invention relates to an improved detachable tread member particularly adapted for use in connection with any form of support, which may rest on or engage with the ground, and it has for its purpose to provide an article of this character which may be manufactured for a relatively low cost and sold at a reasonable profit.

The present invention has as another purpose improved means consisting of metal keepers U-form in cross section adjacent the margin of the base member, in conjunction with arched staples adjacent one end of the base member countersunk adjacent opposite ends of a groove, which staples cooperate with similar staples and the first keepers with countersunk tongues carried by a tread member to be attached, a key to be inserted through the arched staples to lock the tread member in place.

It is to be understood that the particulars herein given are in no way limitive, and that while still keeping within the scope of the invention, any desired modification of details and proportions may be made in the construction of the invention according to circumstances.

The invention comprises further features and combination of parts to be hereinafter set forth, shown in the drawings and claimed.

Figure 1:
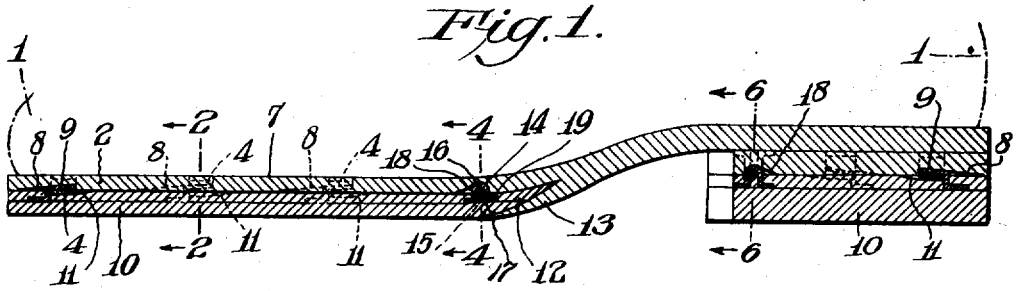
Figure 1 is a sectional view through permanent base members and detachable tread members, showing the construction of the keepers and the arched staples.

Referring to the drawings, 2 identifies a permanent base member, and fastened to the permanent base member adjacent its margin is a plurality of keepers 4, which are U-shaped and are countersunk in the underface of the permanent base member. These keepers have sharpened or tapered sides 5, which are clinched at 6 on one side of the base member 7, thereby permanently attaching the keepers. The under face of the permanent base member has inclined grooves 8 leading toward the keepers, to guide spring tongues 9, which are carried by a detachable tread member 10 to be attached. The spring tongues are of an overhanging construction and are tapered, and are slightly inclined, so as to possess the characteristic of drawing the tread member tight against the permanent base member. Each tongue has a sharpened shank which is driven through the detachable tread member to be attached and is clinched so as to retain the tongue in position at all times, even though the shank may be subjected to wear.

The face of the detachable tread member which engages the under face of the permanent base member is also provided with grooves 11 leading up to and under the tongues to receive the keepers, as they are engaged by the tongues.

Prior to attaching the tread member it is the purpose to apply a reasonable amount of adhesive such as composition of paraffin and cement or the like to the face of the detachable tread member, and when the tread member is forced into position, the composition will spread a reasonable distance toward the edges of the members about its entirety and insure a relatively permanent seal between the detachable tread member to be attached and the permanent base member. Should any of the composition ooze beyond the face of the edges of the tread member, it may be burnished or wiped off to insure a flush and tight joint.

The rear edge of the detachable tread member is tapered as at 12, and engages under a portion of the permanent sole as at 13, there being a requisite amount of similar composition applied at this point to insure a seal. Also the adjacent faces of the permanent base member and the detachable tread member have registering transverse grooves 14 and 15, and countersunk therein and adjacent their opposite ends are arched staples 16, which receive a locking key 17, when the tread member is placed in position. The adjacent faces of the permanent base member and the detachable tread member have inclined grooves 18 leading toward the arched staples, so as to receive the staples when the tread member is secured in position. The arched staples also have sharpened prongs which are driven through the permanent base and tread members and are clinched as at 19.

Figure 2:
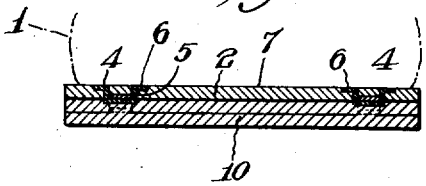
Figure 2 is a transverse sectional view on line 2—2 of Figure 1, more clearly showing the construction of the keepers and the tongues engaged therewith.
Figure 4:
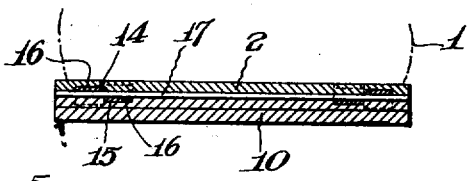
Figure 4 is a cross-sectional view through that portion of the base and tread members where the arched staples are used adjacent the grooves of the permanent base members and detachable tread members and showing the key in position.
Figure 3:
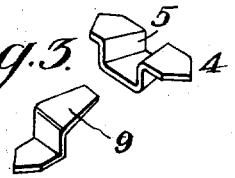
Figure 3 is an enlarged detail sectional view through one of the keepers and one of the tongues.
Figure 5:
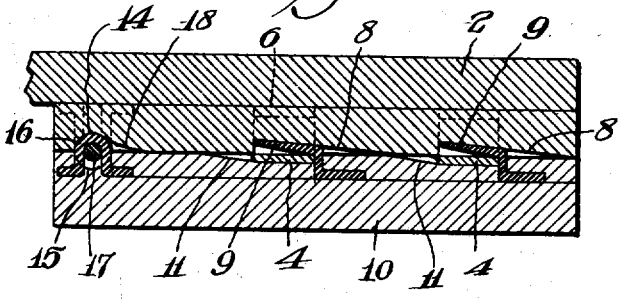
Figure 5 is an enlarged detail sectional view through one of the base members and its tread member, showing the keepers and the tongues and the arched staples to receive the key.
Figure 6:
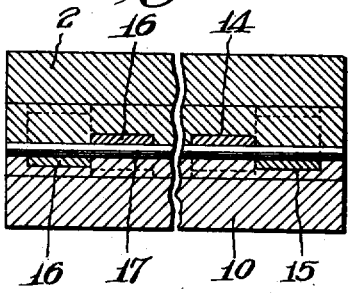
Figure 6 is an enlarged sectional view through those portions of one of the base members and one of the tread members where the key is used for locking the tread member in position.

The tread member 10 in Figures 5 and 6 is similarly fastened in position, the various connecting means being similar in every detail to those carried by the permanent base and tread members in Figures 2 and 4, and therefore designated by the same reference characters.

In order to attach a tread member, the old tread member is first removed, by breaking the cement, and then by imparting a sliding movement of the new tread member so as to cause the tongues to engage with the keepers, and the arched staples to register, a key may be inserted. The same action is used for connecting the tread member 10 in Figures 5 and 6 to the permanent base member with the exception that the tread member 10 in Figures 5 and 6 is moved in an opposite direction, and due to this fact, the more the tread member engages with the ground the tighter it may engage in position, provided no composition is used.

However, by this movement of the tread member to be attached, the tread member in Figures 5 and 6 is brought tight to the permanent base member, and thereby causes the tongues and the keepers to co-operate.

I claim:

1. In a detachable tread member, a permanent base having on its under surface a plurality of grooves with their bottoms inclined slightly upwardly to provide deepened portions with adjoining shoulders at certain ends of the grooves, keepers with legs driven into the permanent base having transverse parts overlying across said deepened ends, certain edges of the transverse parts being immediately adjacent said shoulders, a tread member with angular tongues with said ends imbedded and fastened in one face of the tread member with their other ends tapered in thickness toward their extremities corresponding to the inclined bottoms of the grooves, one face of said tread member being grooved at points immediately under the tapered portions of the tongues to receive the transverse parts of the keepers, said second grooves at points beyond the extremities of the tapered parts of the tongues having their bottoms inclined, whereby the transverse parts of the keepers may enter the second grooves and the tapered portions of the tongue may cooperate with the under surface of the transverse part and the inclined bottoms of the first grooves to cause a wedging lock of the tongues with the keepers, said tongues and keepers cooperating to prevent movement of the tread member in one direction, and means for fastening the tread and base members together at one end to prevent movement in the opposite direction.

2. In combination with foot apparel having a heel member and a tread member, keepers fixed on one of the members, each having a receiving portion spaced from the member to which it is attached, said keepers being constructed of substantially rigid material, tapered tongues constructed of the same material as the keepers fixed to the other member, having inclined surfaces for engaging the receiving portion of the keepers to cooperate therewith for attaching the tread member to the heel member, the distance between the keepers and the surfaces above the keepers being arranged to cause the tapered tongues to have a wedging action when in engagement, and means to lock the tongues and keepers in wedged relation.

BENJAMIN RUBIN.